(12) United States Patent
Chen et al.

(10) Patent No.: US 12,067,136 B2
(45) Date of Patent: Aug. 20, 2024

(54) DISPLAY METHOD, DISPLAY DEVICE, AND ELECTRONIC DEVICE

(71) Applicant: Beijing Zitiao Network Technology Co., Ltd., Beijing (CN)

(72) Inventors: Yingyuan Chen, Shanghai (CN); Yuanhui Liang, Shenzhen (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/816,414

(22) Filed: Jul. 30, 2022

(65) Prior Publication Data

US 2022/0366066 A1    Nov. 17, 2022

Related U.S. Application Data

(63) Continuation of application No. PCT/CN2021/129997, filed on Nov. 11, 2021.

(30) Foreign Application Priority Data

Nov. 30, 2020 (CN) .......................... 202011384244.6

(51) Int. Cl.
    *G06F 21/62* (2013.01)
    *G06F 21/55* (2013.01)

(52) U.S. Cl.
    CPC ........ *G06F 21/6209* (2013.01); *G06F 21/554* (2013.01); *G06F 2221/034* (2013.01)

(58) Field of Classification Search
    CPC ............... G06F 21/6209; G06F 21/554; G06F 2221/034

USPC .......................................................... 726/26
    See application file for complete search history.

(56) References Cited

U.S. PATENT DOCUMENTS

| | | | |
|---|---|---|---|
| 9,509,672 B1 * | 11/2016 | Barak | ................. H04L 63/0815 |
| 9,529,993 B2 * | 12/2016 | Kapadia | .................. G06F 21/40 |
| 9,591,489 B2 * | 3/2017 | Boss | .................... G06F 3/04845 |
| 11,165,776 B2 * | 11/2021 | Nassar | .................. H04L 63/102 |
| 11,244,034 B1 * | 2/2022 | Nagappan | ............ G06F 21/316 |
| 2005/0055583 A1 | 3/2005 | Tanaka et al. | |

(Continued)

FOREIGN PATENT DOCUMENTS

| | | |
|---|---|---|
| CN | 1591448 A | 3/2005 |
| CN | 106550044 A | 3/2017 |

(Continued)

OTHER PUBLICATIONS

Office Action issued Jan. 18, 2022 issued in Chinese Patent Application No. 202011384244.6.

(Continued)

*Primary Examiner* — Dereena T Cattungal

(74) *Attorney, Agent, or Firm* — Faegre Drinker Biddle & Reath LLP

(57) ABSTRACT

A display method, a display device, and an electronic device are provided. The method includes: determining, in response to a current account not having an access authority for accessing a target file, an associated account of the current account, where a user corresponding to the associated account matches a user corresponding to the current account; and displaying prompt information based on a relevant authority of the associated account for the target file, where the relevant authority includes at least one of an access authority and an application authority.

13 Claims, 13 Drawing Sheets

---

Determine, in response to a current account not having an access authority for accessing a target file, an associated account of the current account — 101

Display prompt information based on a relevant authority of the associated account for the target file — 102

(56) References Cited

U.S. PATENT DOCUMENTS

| | | | |
|---|---|---|---|
| 2007/0061311 A1 | 3/2007 | Kurose | |
| 2008/0046983 A1* | 2/2008 | Lester | G06F 21/31 726/5 |
| 2012/0144454 A1* | 6/2012 | Lee | G06F 21/6218 726/4 |
| 2013/0066975 A1* | 3/2013 | Kantor | H04L 69/321 709/205 |
| 2013/0340053 A1* | 12/2013 | McCoy | G06F 21/31 726/5 |
| 2014/0181104 A1* | 6/2014 | Chin | H04L 67/306 707/736 |
| 2014/0237347 A1* | 8/2014 | Jeyachandran | G06F 40/169 715/234 |
| 2015/0249660 A1* | 9/2015 | Bailey | G06F 21/30 726/8 |
| 2015/0281203 A1* | 10/2015 | Granström | G06F 16/24 726/4 |
| 2016/0205103 A1* | 7/2016 | Lee | H04L 63/10 726/30 |
| 2018/0033072 A1* | 2/2018 | Karthikeyan | H04L 63/104 |
| 2019/0130107 A1* | 5/2019 | Huang | G06F 21/82 |
| 2019/0190875 A1* | 6/2019 | Dhariwal | G06F 16/951 |
| 2019/0306172 A1* | 10/2019 | Dande | H04L 63/105 |
| 2019/0394240 A1* | 12/2019 | Israel | H04L 63/107 |
| 2020/0065397 A1* | 2/2020 | Goenka | G06F 16/1834 |
| 2020/0244662 A1* | 7/2020 | Lee | H04L 63/101 |
| 2021/0397647 A1* | 12/2021 | Dickoff | H04W 12/08 |

FOREIGN PATENT DOCUMENTS

| | | |
|---|---|---|
| CN | 106991336 A | 7/2017 |
| CN | 107273758 A | 10/2017 |
| CN | 109472607 A | 3/2019 |
| CN | 110334489 A | 10/2019 |
| CN | 110348236 A | 10/2019 |
| CN | 111324875 A | 6/2020 |
| CN | 103618717 A | 9/2020 |
| CN | 111709732 A | 9/2020 |
| CN | 111831990 A | 10/2020 |
| CN | 112487451 A | 3/2021 |
| EP | 1513091 A1 | 3/2005 |
| JP | 2005-259104 A | 9/2005 |
| JP | 2007-066206 A | 3/2007 |
| JP | 08-153072 A | 7/2008 |
| JP | 2012-238050 A | 12/2012 |

OTHER PUBLICATIONS

Office Action issued May 6, 2022 issued in Chinese Patent Application No. 202011384244.6.

Search Report issued Jan. 10, 2022 issued in PCT Application No. PCT/CN2021/129997.

Office Action received for Japanese Patent Application No. 2023-532270, mailed on Jun. 4, 2024, 8 pages (4 pages of English Translation and 4 pages of Original Document).

* cited by examiner

DISPLAY METHOD, DISPLAY DEVICE, AND ELECTRONIC DEVICE

CROSS REFERENCE TO RELATED APPLICATION

The present application is a continuation of International Patent Application No. PCT/CN2021/129997, filed on Nov. 11, 2021, which claims priority to Chinese Patent Application No. 202011384244.6, titled "DISPLAY METHOD, DISPLAY DEVICE, AND ELECTRONIC DEVICE", filed on Nov. 30, 2020, both of which are incorporated herein by reference in their entireties.

TECHNICAL FIELD

The present disclosure relates to the field of internet technologies, and in particular, to a display method, a display device, and an electronic device.

BACKGROUND

With the development of science and technology, functions of terminal applications are becoming more and more perfect. For example, some office software also supports browsing online documents. In order to ensure the privacy and security of the online document, an access authority is usually set for a user account, that is, when the user's account has the access authority required by the document, the access to the online document can be realized.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

Embodiments of the present disclosure provide a display method, a display device and an electronic device, a way to access a target file may be prompted to a user by displaying prompt information, so that the user can efficiently access the target file.

In a first aspect, a display method is provided according to an embodiment of the present disclosure. The method includes: determining, in response to a current account not having an access authority for accessing a target file, an associated account of the current account, where a user corresponding to the associated account matches a user corresponding to the current account; and displaying prompt information based on a relevant authority of the associated account for the target file, where the prompt information is used to prompt a way to access the target file, and the relevant authority includes at least one of an access authority and an application authority.

In a second aspect, a display device is provided according to an embodiment of the present disclosure. The device includes: a first determining unit configured to determine, in response to a current account not having an access authority for accessing a target file, an associated account of the current account, where a user corresponding to the associated account matches a user corresponding to the current account; and a displaying unit configured to display prompt information based on a relevant authority of the associated account for the target file, where the prompt information is used to prompt a way to access the target file, and the relevant authority includes at least one of an access authority and an application authority.

In a third aspect, an electronic device is provided according to an embodiment of the present disclosure. The electronic device includes one or more processors and a storage apparatus storing one or more programs. The one or more programs, when executed by the one or more processors, cause the one or more processors to perform the display method described in the above first aspect.

In a fourth aspect, a computer-readable medium is provided according to an embodiment of the present disclosure. The computer-readable medium stores a computer program. The computer program, when executed by a processor, causes the processor to perform the display method described in the above first aspect.

According to the display method, the display device and the electronic device provided in the embodiments of the disclosure, when a current account does not have an access authority for accessing a target file, an associated account of the current account may be determined and prompt information may be displayed based on a relevant authority of the associated account for the target file. The relevant authority may include an access authority and an application authority. In this way, the prompt information may be displayed based on the authority of the associated account for the target file, that is, the prompt information can prompt the way to access the target file, so the user can efficiently access the target file according to the prompt information.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF THE EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
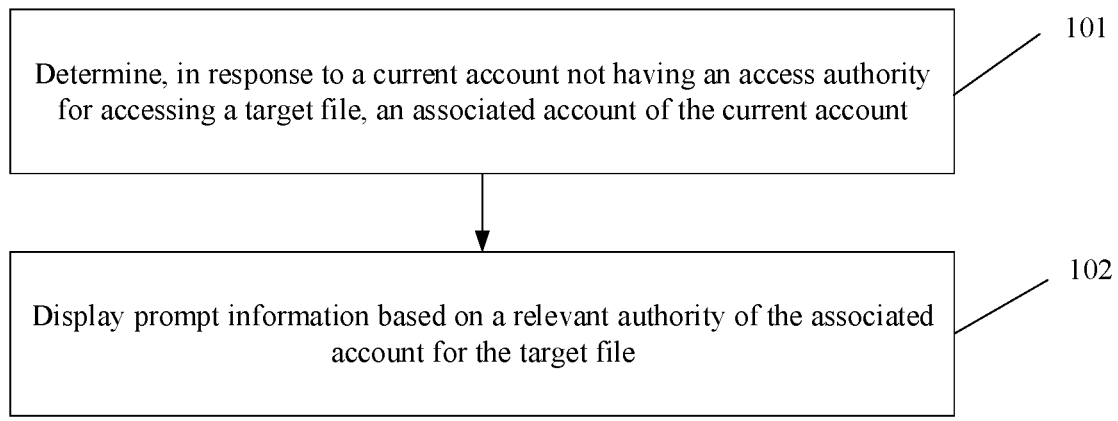
FIG. 1 is a flowchart of a display method according to an embodiment of the present disclosure.

Reference is made to FIG. 1, which is a flowchart of a display method according to an embodiment of the present disclosure. The display method may be applied to a terminal device. As shown in FIG. 1, the display method includes steps 101 and 102.

In step 101, in response to a current account not having an access authority for accessing a target file, an associated account of the current account is determined.

Here, the current account may be understood as an account of the user currently logged in to the application.

Here, a user indicated by the associated account matches a user indicated by the current account. As an example, the current account and the associated account of the current account are accounts of the same user, that is, the current account and the associated account may be accounts registered based on the same identity identifier.

As an example, the identity identifier may be the user's communication number, email address, and the like.

Here, the target file may be an online file. As an example, when the online file is created, a relevant authority may only be assigned to certain accounts, that is, the user cannot access the target file by using an account that does not have the relevant authority for the target file.

Here, a case that the current account does not have the access authority for accessing the target file means that the current account cannot be used to access the target file.

In some embodiments, the current account may have the application authority for the target file, but the current account does not have the access right authority for the target file. That is, if the current account does not have the access authority for the target file, it means that the current account cannot be used to access the target file. When the current account has the application authority, the current account cannot be used to access the target file, but the current account may be used to apply to access the target file.

In step 102, prompt information is displayed based on a relevant authority of the associated account for the target file.

Here, the prompt information is used to prompt a way to access the target file.

Here, the relevant authority includes at least one of an access authority and an application authority.

Here, the access authority may be an authority for directly accessing the target file, that is, the user may directly access the target file by using an account having the access authority for the target file.

Here, the application authority may be an authority for applying to access the target file. That is, the user may send a request for instructing to apply for access to the target file by using an account with the application authority.

Here, the way to access the target file may include direct accessing, and first applying for the access authority and then accessing.

As an example, the target file may be accessed by using an associated account that has the access authority for the target file, and a request for acquiring the access authority for the target file may be applied by using an associated account that has the application authority for the target file.

It can be seen that, when a current account does not have an access authority for accessing a target file, an associated account of the current account may be determined and prompt information may be displayed based on a relevant authority of the associated account for the target file. The relevant authority may include an access authority and an application authority. In this way, the prompt information may be displayed based on the authority of the associated account for the target file, that is, the prompt information can prompt the way to access the target file, so the user can efficiently access the target file according to the prompt information.

In some embodiments, the prompt information may be text information, and the user may select a way to obtain the access authority for the target file according to the instruction of the prompt information.

In some embodiments, the current account and the associated account may be accounts of the user in different groups of the same application. For example, an application A used for office work may be used by various groups in the company (in some implementations, each group may be understood as a tenant). For example, if there are five groups, if the user is an office worker in the group, an account corresponding to the group may need to be registered; therefore, when a user needs to perform the office work in multiple groups (for example, processing flow personnel, personnel handling personnel), the user may have multiple accounts.

As an example, some files may be specific to the group (for example, the content recorded in an online file is the identity information of employees in the group), then these files may not be allowed to be disclosed to the public, that is, only accounts in the specific group can apply for the access authority. Correspondingly, when the online file can be made public, it may be indicated that not only accounts in the specific group can apply for the access authority, but also accounts in other groups can apply for the access authority.

In some embodiments, the current account does not have the access authority for accessing the target file; step 102 (displaying prompt information based on a relevant authority of the associated account for the target file) may specifically include: displaying an application control in response to the current account having the application authority for applying to access the target file; and sending an authority application request in response to detecting a triggering operation for the application control.

Figure 2:
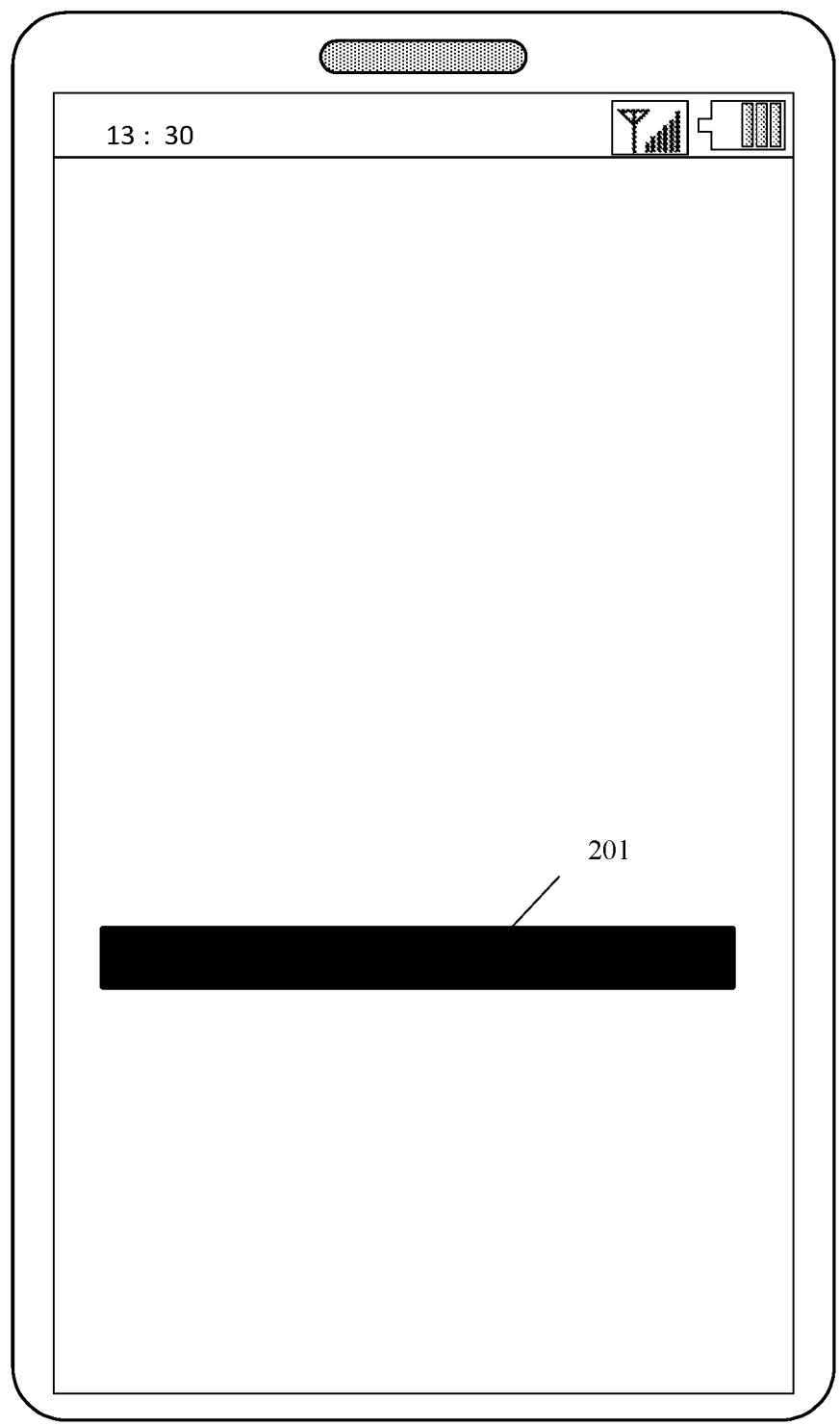
FIG. 2 is a schematic diagram of display interface in the display method according to an embodiment of the present disclosure.

In some embodiments, as shown in FIG. 2, an application control 201 may be displayed on the display interface, and after a triggering operation is performed on the application control 201, an authority application request may be sent.

In some embodiments, the authority application request may be used for instructing to obtain the relevant authority of the target file.

Here, the relevant authority may include the access authority for the target file (the target file can be only read and cannot be edited), the editing authority for the target file (the target file can be edited and read), and the like.

Figure 3:
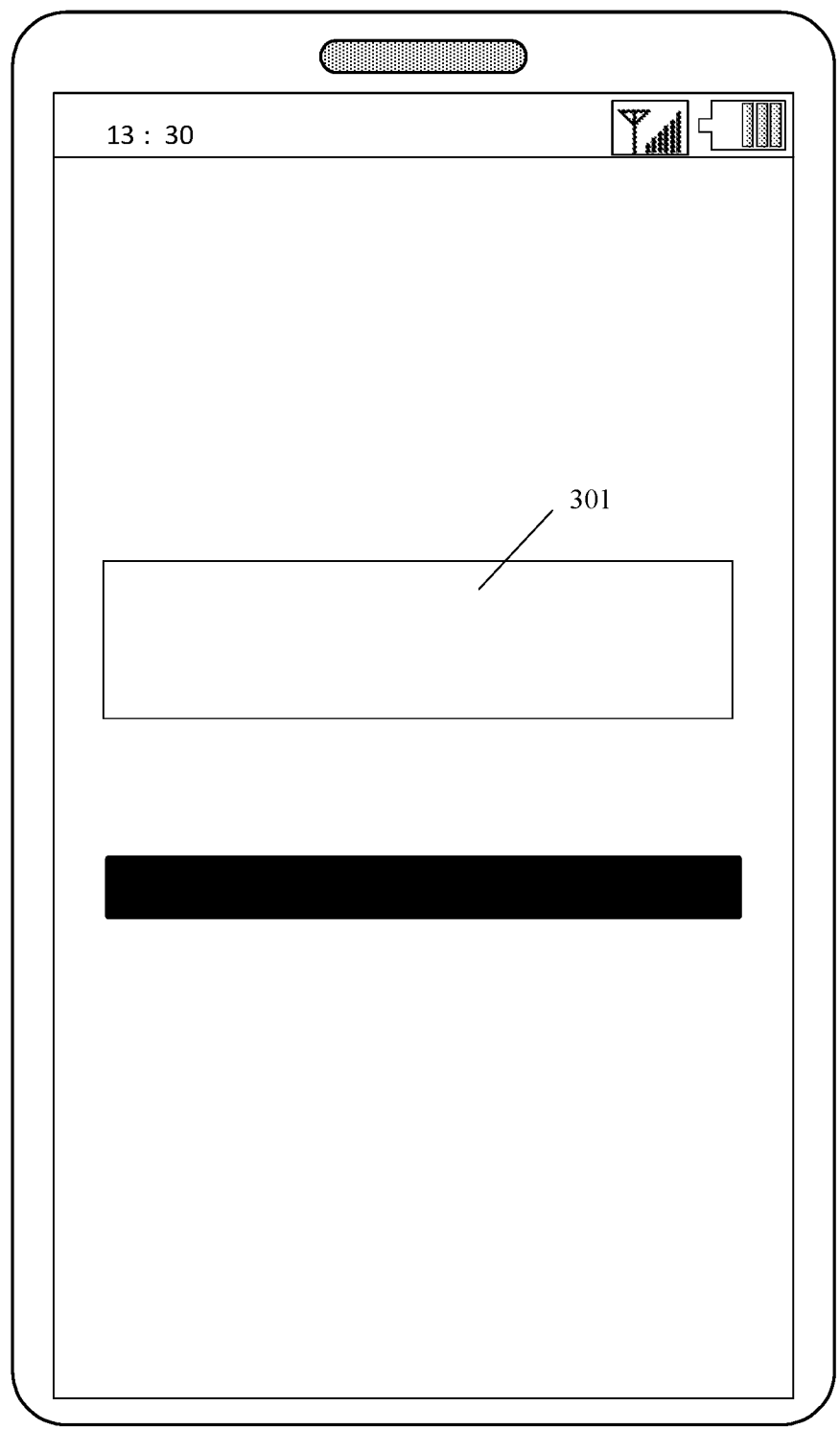
FIG. 3 is a schematic diagram of display interface in the display method according to another embodiment of the present disclosure.

In some embodiments, the authority application request may include the current account and a specific application reason, and the specific application reason may be preset by the user or inputted by the user. That is, as shown in FIG. 3, an application reason input box 301 may be displayed on the display interface, and the user may input a specific application reason in the input box.

In some embodiments, step 102 (displaying prompt information based on a relevant authority of the associated account for the target file) may specifically include: displaying, in response to determining that the associated account includes a first type associated account having the access authority for accessing the target file, the first type associated account and an access control.

Here, the first type associated account has the access authority for the target file.

In some embodiments, when the user creates the target file, some accounts may be determined as accounts that can directly access the target file, that is, these accounts have the access authority for the target file.

In some embodiments, when the associated account includes the first type associated account, it can be indicated that a certain account of the user can directly access the target document. For example, if the user has 3 accounts, the currently logged-in account does not have the access authority for the target file, and one of two associated accounts corresponding to the currently logged-in account has the access authority for the target file, the associated account having the access authority for the target file may be directly displayed, and an access control corresponding to the associated account may be displayed. That is, in this case, the associated account having the access authority for the target file may be understood as the first type associated account.

Here, by displaying the first type associated account and the access control, the user can know which associated account is used to access the target file, that is, the efficiency of the user accessing the target file is further improved.

Figure 4:
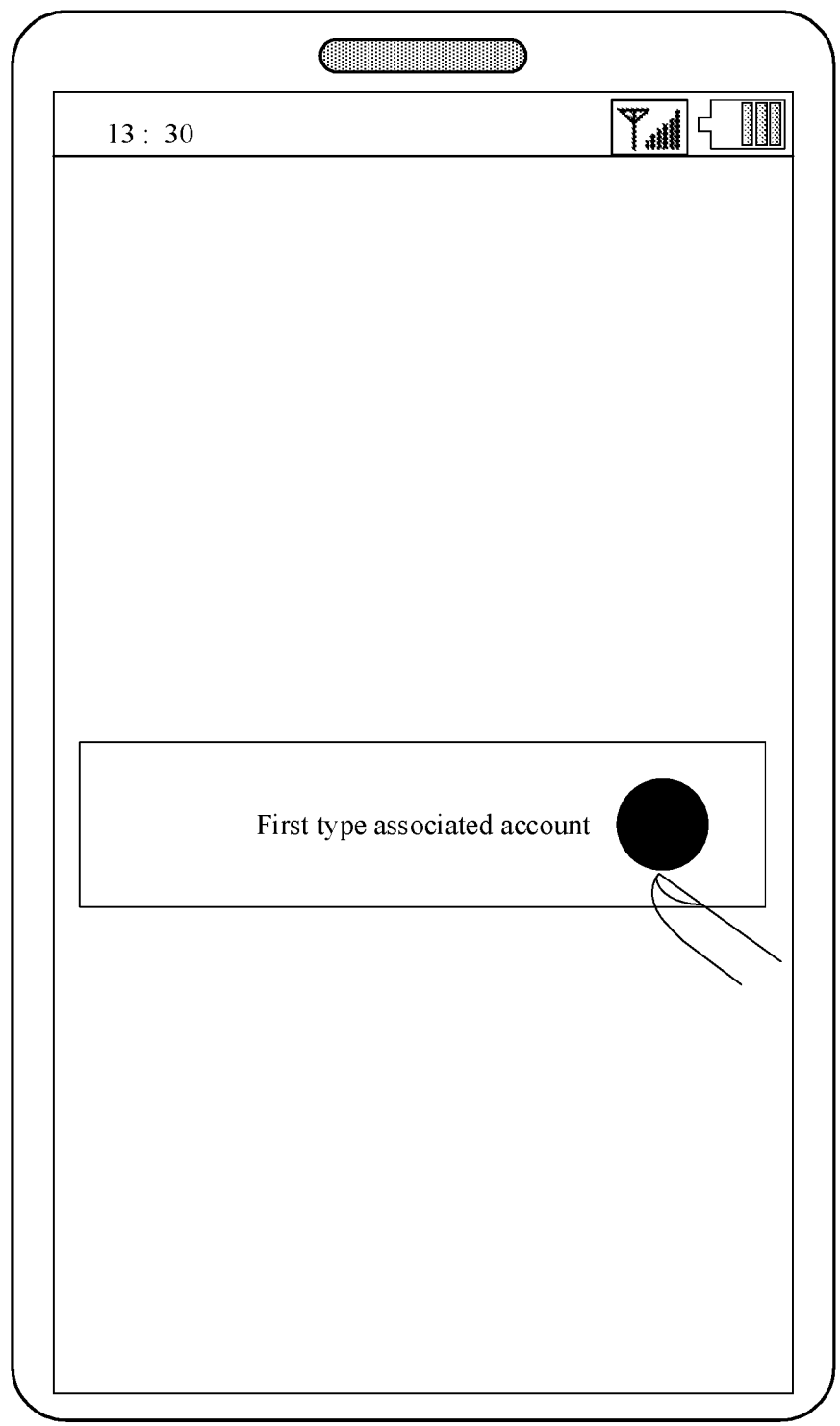
FIG. 4 is a schematic diagram of display interface in the display method according to another embodiment of the present disclosure.

In some embodiments, the process switches to the first type associated account and the target file is displayed, in response to detecting a triggering operation for the access control As shown in FIG. 4, the first type associated account and the access control (the black circle in FIG. 4 may represent the access control) may be directly displayed. Of course, in a specific implementation, a name of the first-type associated account, a group identifier of the first-type associated account, and the like may also be displayed. When the access control is triggered, the current account may be directly switched to the first-type associated account, and the first-type associated account may be used to access the target file.

In some embodiments, when the associated account includes the first type associated account, the first type associated account and the access control may be directly displayed, so that the user only needs to perform a triggering operation for the access control corresponding to the first type associated account, to access the target file by using the first type associated account. That is, the user can easily access the target file.

In some embodiments, in response to determining that the associated account includes an account associated with the associated account, the group associated with the management account group and an access control are displayed.

Here, the management account group is a group to which the associated account for the target file belongs.

In some embodiments, the account associated with the management account group may be understood as the first type associated accounts. Therefore, the account associated with the management account group may be displayed so that the user may use the account to access the target file.

In some embodiments, for the convenience of setting, the user grants relevant authority in units of groups. For example, the management account group may be determined as an access authority group, and all accounts in the management account group have the access authority for the target file. In this case, the account associated with the management account group may be understood as all accounts in the management account group.

In some embodiments, step 102 (displaying prompt information based on a relevant authority of the associated account for the target file) may specifically include: hiding an account list of the associated account in response to determining that the associated account does not include an account having the relevant authority for the target file.

In some embodiments, when the associated account does not have the relevant authority for the target file, it may be indicated that the user cannot access the target file by using the associated account, and the associated account may be hidden in order to make the display interface tidy.

In some embodiments, the account list of the associated account is hidden in response to determining that the associated account does not include an account having the access authority for the target file.

In some embodiments, the current account does not have the access authority, and the associated account does not include an account having the access authority for the target file. It may be indicated that the authority of the account in the associated account with respect to the target file is the same as or lower than the authority of the current account with respect to the target file. Therefore, the account list of the associated account may be hidden in order to make the display interface tidy.

For example, if both the current account and the associated account have the application authority for the target file, the user may directly use the current account to apply for the relevant authority for the target file. Therefore, the associated account may be hidden in order to make the display interface tidy.

It should be noted here that when applying for the relevant authority of the target file, the user may apply for the access authority for the target file (the target file can be only read and cannot be edited), the editing authority for the target file (the target file can be edited and read), and the like.

In some embodiments, the display interface includes a folding control, an account list of the associated account is displayed in response to detecting a triggering operation for the folding control.

In some embodiments, the associated account may be displayed by the user triggering the folding control.

In some embodiments, the displayed associated account may be an associated account having the relevant authority for the target file, that is, when an associated account does not have the relevant authority for the target file, the associated account will not be displayed.

Figure 5A:
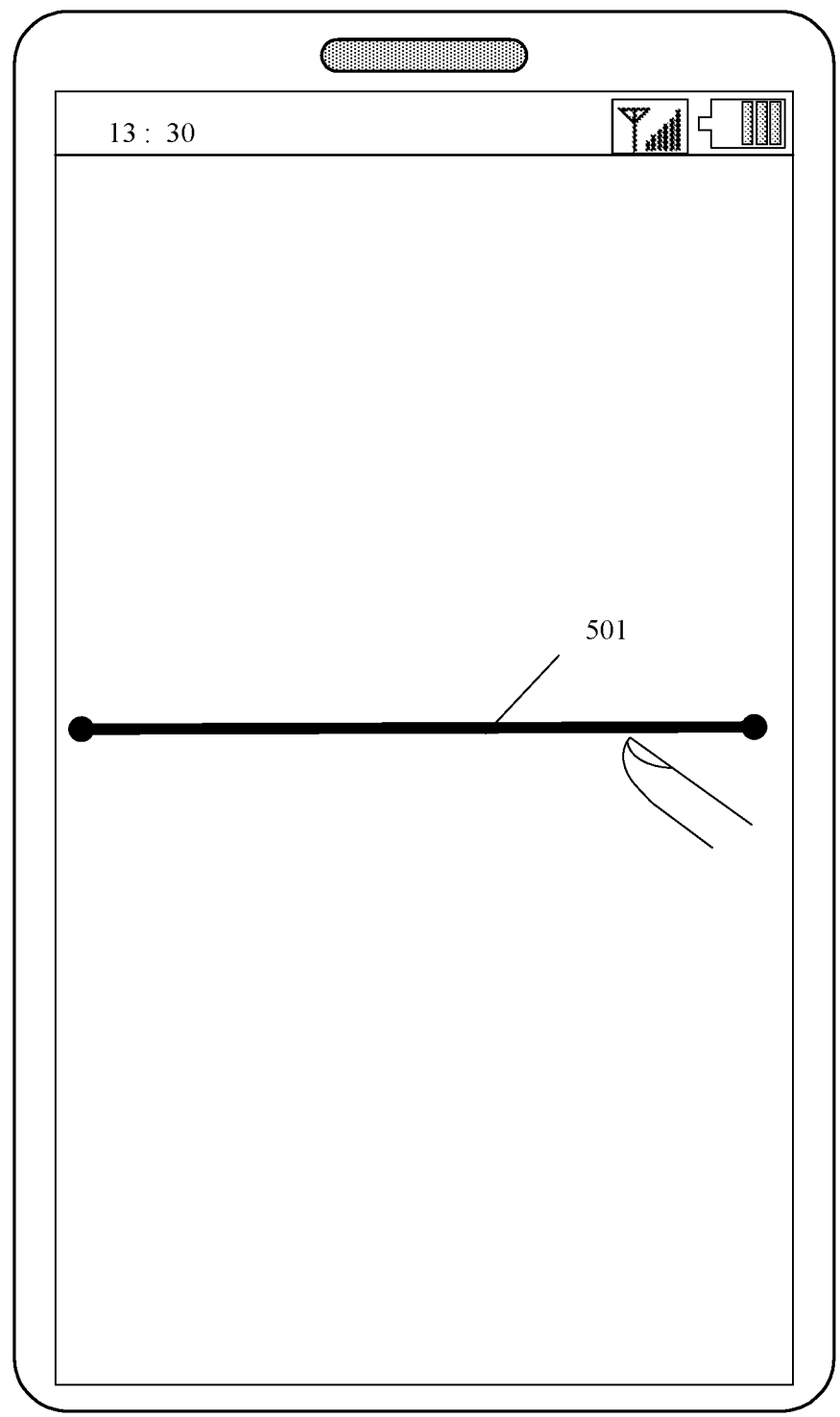
FIGS. 5A and 5B each is a schematic diagram of display interface in the display method according to another embodiment of the present disclosure.
Figure 5B:
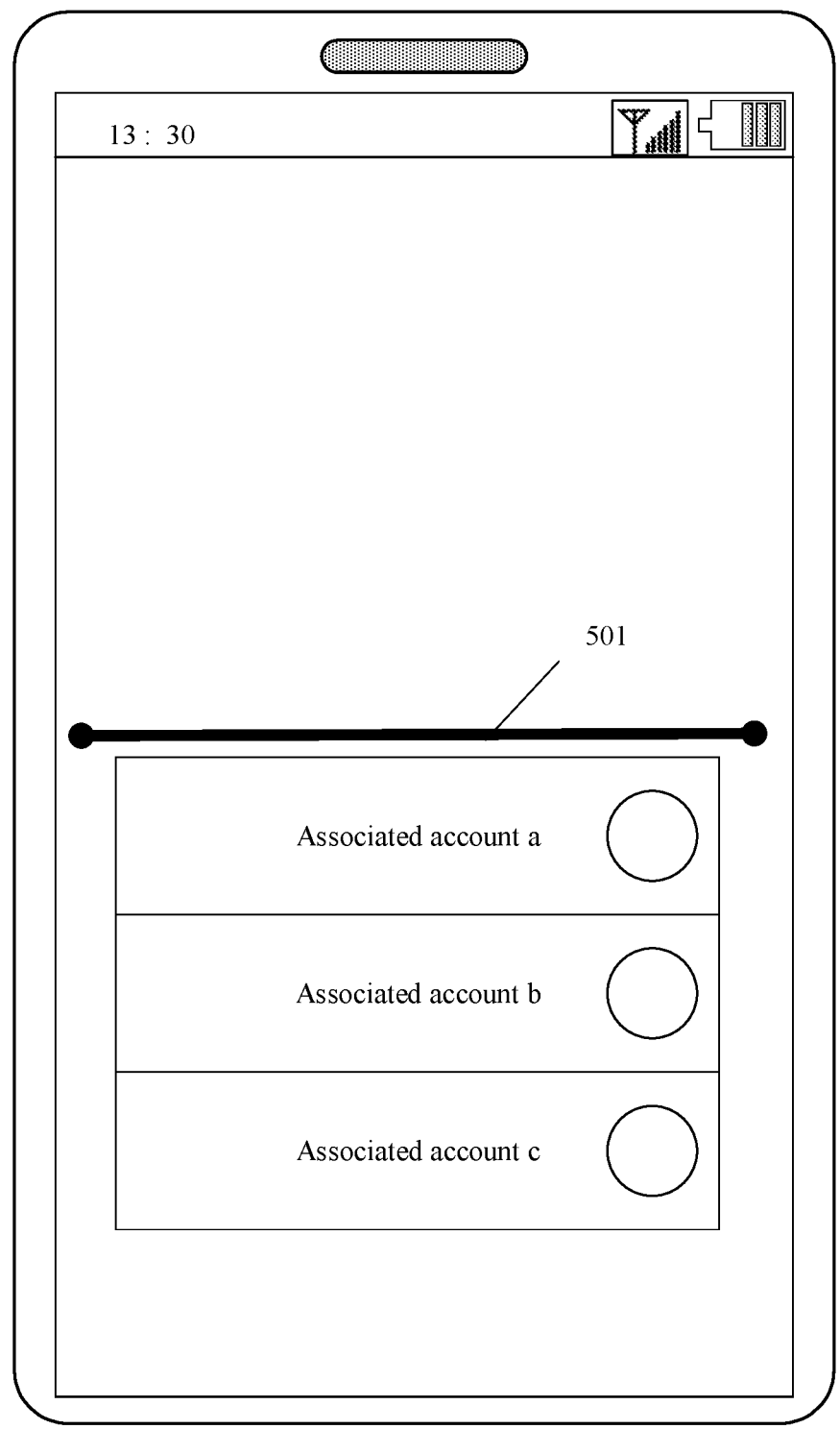

In some embodiments, as shown in FIG. 5A and FIG. 5B, FIG. 5A is a schematic diagram of display interface without displaying the account list, and after a folding control 501 is triggered, the schematic diagram of display interface shown in FIG. 5B may be displayed. That is, the setting of the folding control 501 can make the entire display interface more tidy. In addition, after the user triggers the folding control 501, the account list may also be displayed, so that the user can switch to the application account (the account used by the user to send an authority application request).

In some embodiments, when the account that has the application authority for the target file is displayed, the corresponding switching control (white circle in FIGS. 5A and 5B) may be displayed, that is, when the user performs a triggering operation for the switching control, the current account may be determined as the application account.

In some embodiments, it may be determined whether a group to which the associated account belongs includes a management account group. In response to determining that the group to which the associated account belongs includes the management account group, the associated account belonging to the management account group is displayed in a predefined prominent position.

Here, the management account group is a group to which a management account of the target file belongs.

In some embodiments, since the management account group may be understood as the group to which the management account of the target file belongs, a manager of the target file may often be active in the group. A probability of obtaining the application authority, by using the associated account in the management account group to send a request of applying for the access authority, is high. Furthermore, the associated account belonging to the management account group may be displayed in the predefined prominent position.

Figure 6:
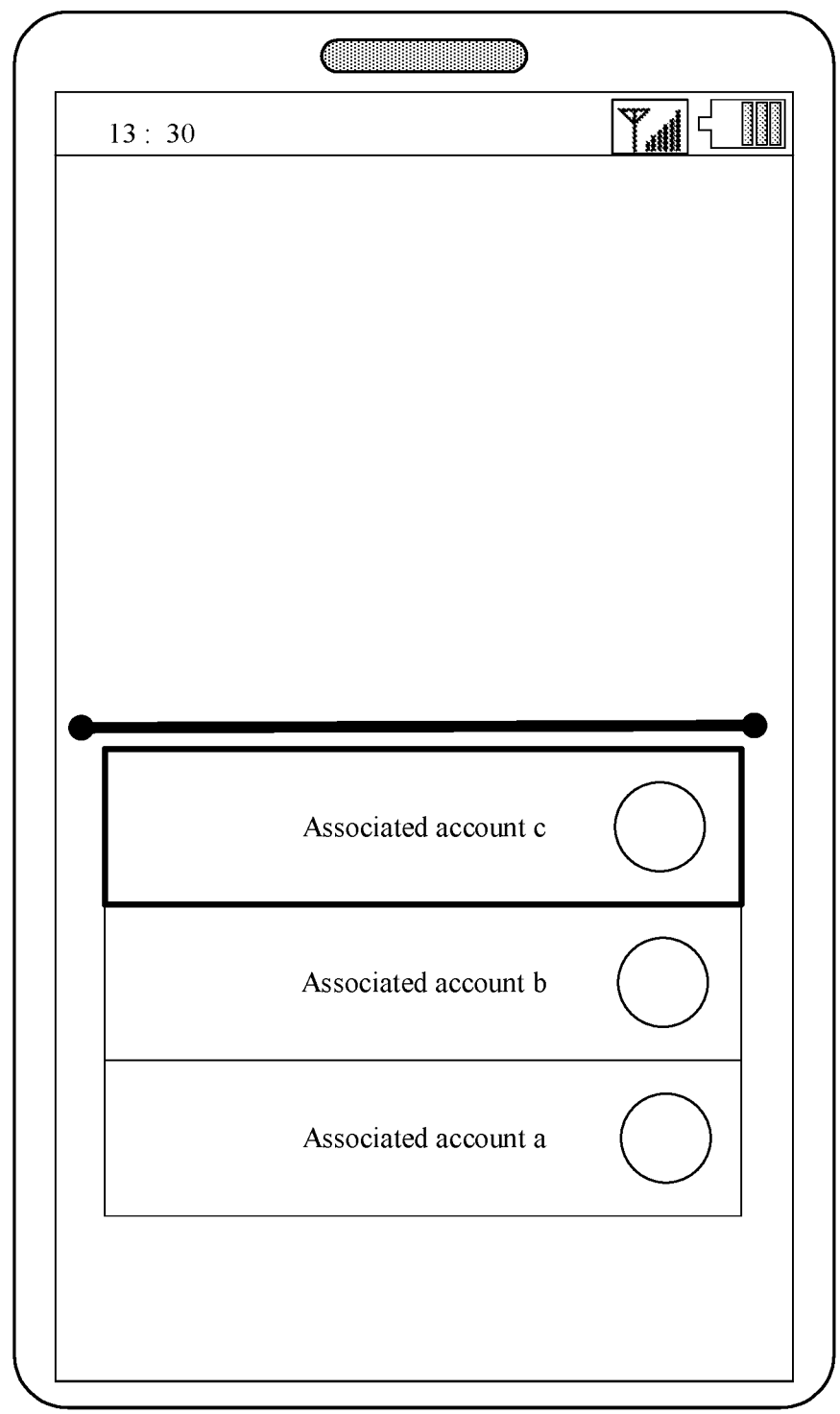
FIG. 6 is a schematic diagram of display interface in the display method according to another embodiment of the present disclosure.

In some embodiments, the pre-defined prominent position may be a top position, that is, when multiple second type associated accounts are displayed in sequence, the associated account belonging to the management account group is displayed on top. As shown in FIG. 6, if the associated account c belongs to the associated account of the management account group, the associated account c may be displayed on top. Compared with the associated accounts not belonging to the management account group, the associated account belonging to the management account group is more likely to obtain the access authority for the target file. Therefore, by displaying the associated account belonging to the management account group in the predefined prominent position, the efficiency of the user accessing the target file can be further increased.

In some embodiments, in response to the current account not having the application authority for applying to access the target file, the account list of the associated account is hidden in response to determining that the associated account does not include an account having the access authority and/or the application authority for the target file.

In some embodiments, when the current account does not have the application authority for applying to access the target file and the associated account does not include an account that has the access authority and/or the application authority for the target file, it may be indicated that the user cannot use the associated account to obtain the relevant authority for the target file. Therefore, the account list of the associated account may be hidden.

In some embodiments, some documents need to be kept confidential (that is, only users in the group can access the documents, and other users cannot access the documents), therefore, accounts in some groups do not have the application authority. Some documents may not need to be kept confidential, and all accounts in the group may have the application authority. That is, it may be understood that disclosure types of the target file include an intra-group disclosure type and an open disclosure type.

Figure 7A:
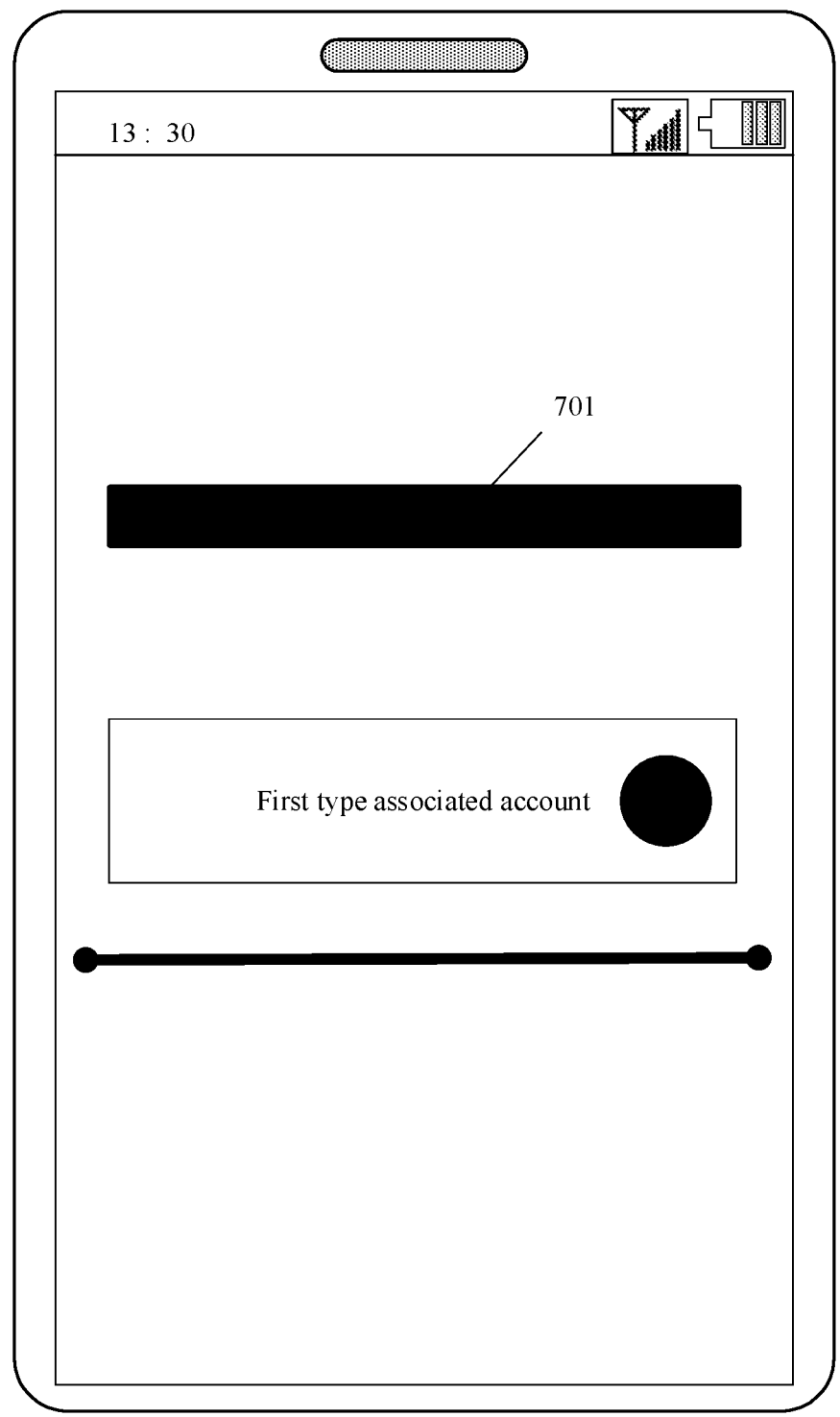
FIGS. 7A and 7B each is a schematic diagram of display interface in the display method according to another embodiment of the present disclosure.
Figure 7B:
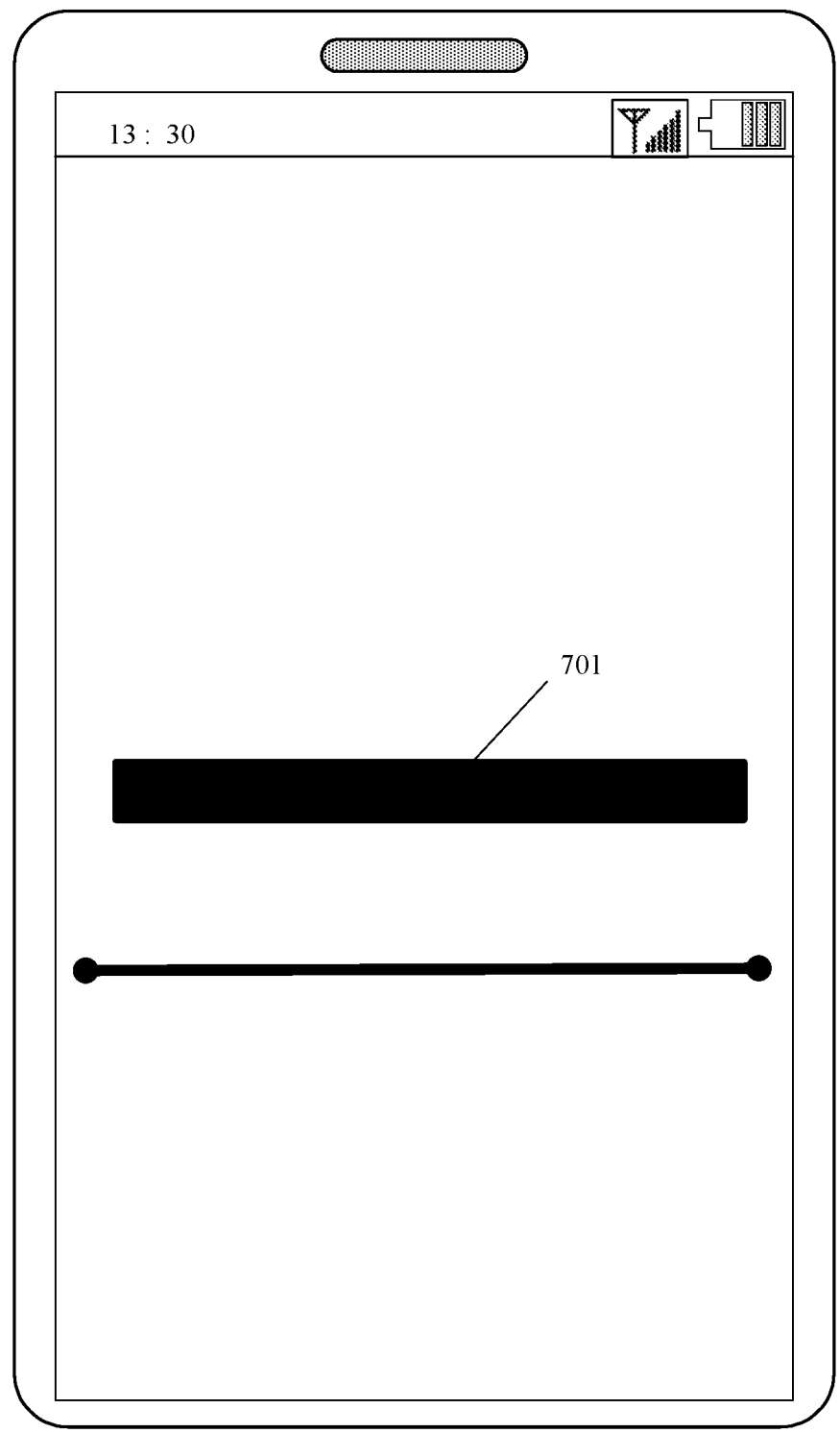

That is, when the disclosure type of the target file is the open disclosure type and both the current account and the associated account have the application authority, an application control may be displayed. If the associated account has the first type associated account, the first type associated account and the access control are displayed, and other accounts rather than the first type associated account in the associated accounts are hidden, as shown in FIG. 7A (the application control 701, the first type associated account and the access control, and the folding control are displayed in FIG. 7A). If the management account does not have the first type associated account, the account list of the associated account may be hidden, as shown in FIG. 7B (the application control 701 and the folding control are shown in FIG. 7B).

When the disclosure type of the target file is the intra-group disclosure type and the current account has the application authority, the application control may be displayed. If the associated account has the first type associated account, the first type associated account and the access control may be displayed.

Figure 8:
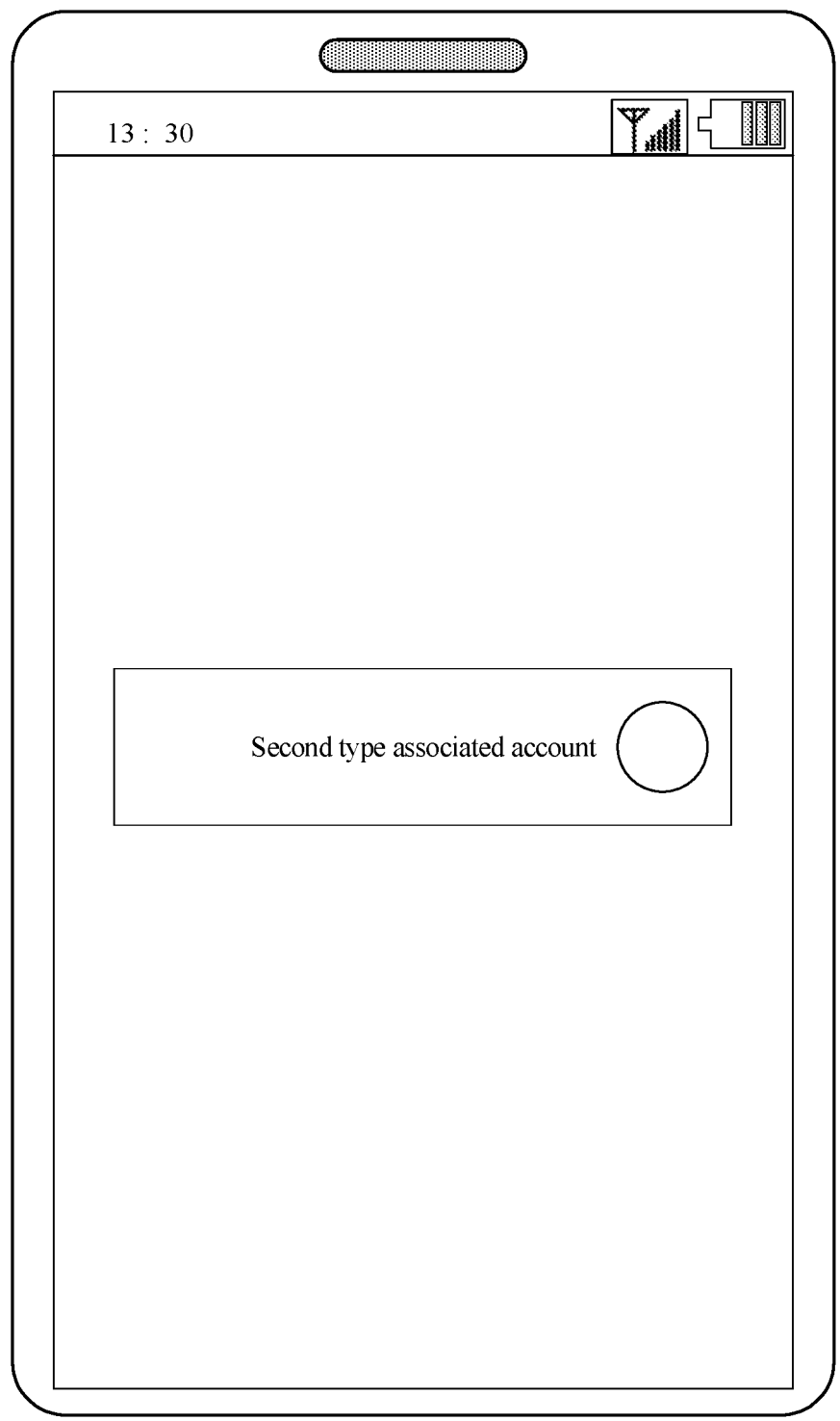
FIG. 8 is a schematic diagram of display interface in the display method according to another embodiment of the present disclosure.

If the current account has the application authority and the associated account has the second type associated account (the account that has the application authority for the target file), the second type associated account and the switch control may be displayed (as shown in FIG. 8, only the second type associated account and the switching control are displayed in FIG. 8); if the associated account does not have the relevant authority for the target file, the account list of the associated account may be hidden.

In some embodiments, in response to the current account not having the application authority for applying to access the target file, the second type associated account and a switch control are displaying in response to determining that the associated account includes the second type associated account having the application authority for the target file.

Here, the switch control is used for triggering to send an authority application request.

In some embodiments, the process switches to the second type associated account, in response to detecting a triggering operation for the switch control; and an authority application request is sent in response to a triggering operation for an application control corresponding to the second type associated account.

In some embodiments, after the triggering operation is performed for the switching control, the second type associated account indicated by the triggering operation may be used as the application account, and the application control may be displayed. After the triggering operation is performed for the application control, an authority application request may be sent.

In some embodiments, the current account does not have the application authority for the target file, and indication information may also be displayed.

Figure 9:
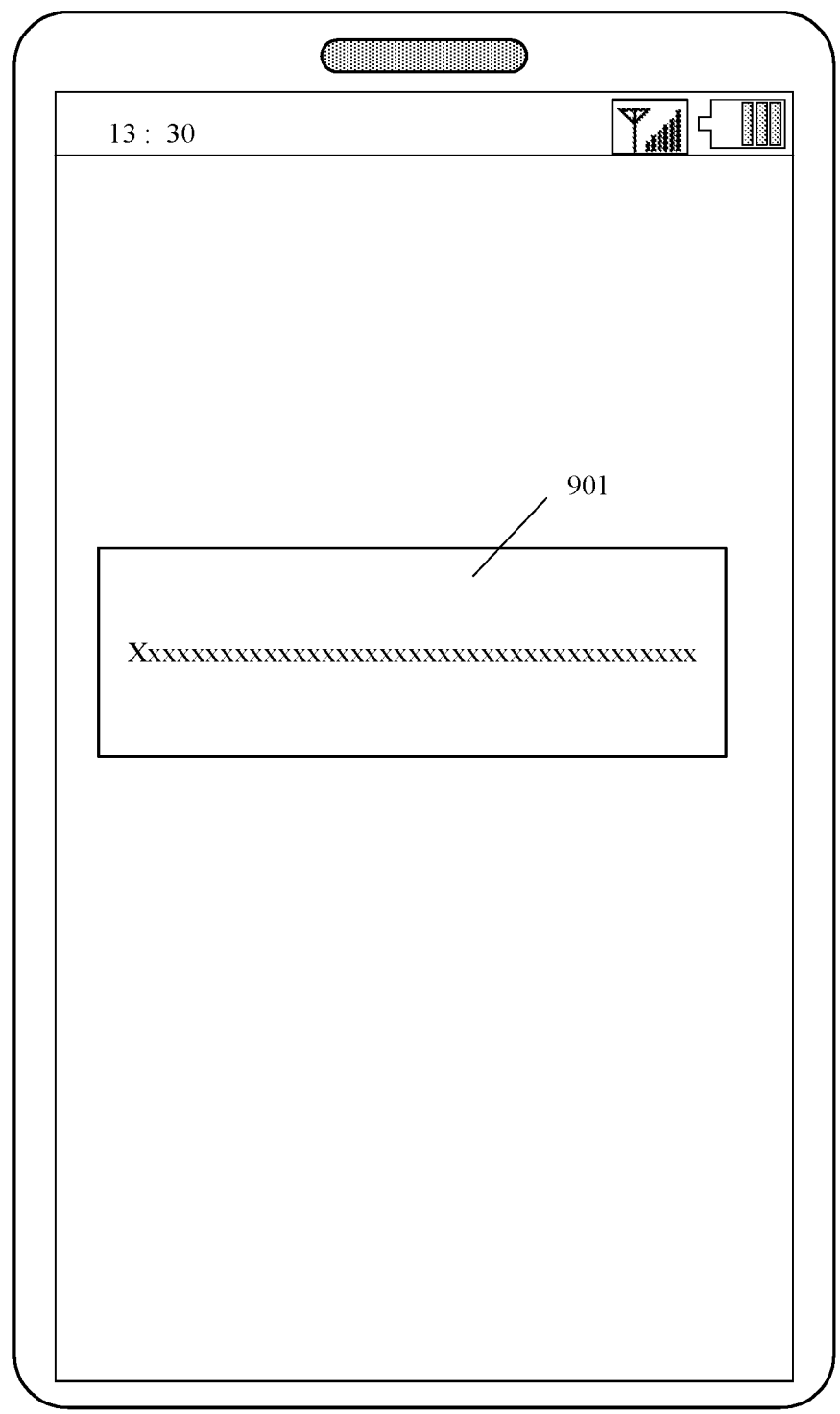
FIG. 9 is a schematic diagram of display interface in the display method according to another embodiment of the present disclosure.

In some embodiments, the indication information may indicate that the disclosure type of the target file is the intra-group disclosure type, as shown in FIG. 9, indication information 901 may be displayed on the display interface. The indication information may be used to indicate that the current account is not in the management account group, so the request of applying for the access authority cannot be sent. Of course, specific content of the indication information may be set according to the specific implementations, which is not limited here, and only needs to be set reasonably according to the actual situation.

In some embodiments, by displaying the indication information or the application control, the user can conveniently know the current method to be used to obtain the access authority for the target file, so that the user can access the target file more efficiently.

In some embodiments, in response to the current account not having the application authority for applying to access the target file, step 102 (displaying prompt information based on a relevant authority of the associated account for the target file) may include: displaying, in response to determining that the associated account includes an account associated with a management account group, the account associated with the management account group and a switch control.

Here, the management account group is a group to which a management account of the target file belongs.

In some embodiments, when the current account does not have the application authority for applying to access the target file, it may indicate that the current account cannot be used to send the authority application request. Therefore, the account that can be used to send the authority application request may be displayed. Here, the account associated with the management account group may be understood as an account that can be used to send the authority application request or an account that can directly access the file. At this time, these accounts may be displayed so that the user can switch the application account, so as to access the target file.

Figure 10:
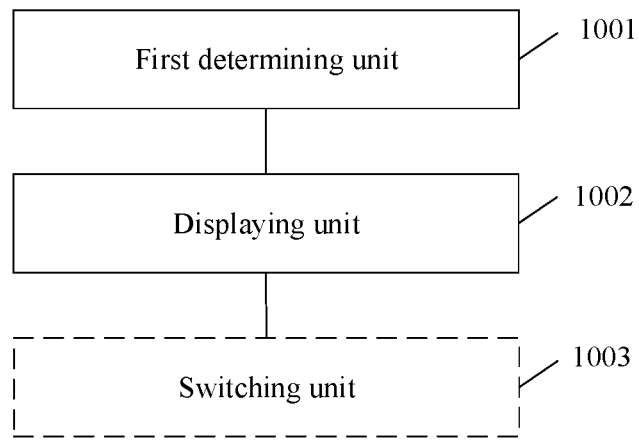
FIG. 10 is a schematic structural diagram of a display device according to an embodiment of the present disclosure.

Reference is made to FIG. 10, as an implementation of the methods described above, the present disclosure provides an embodiment of a display device, the device embodiment corresponds to the display method embodiment shown in FIG. 1, and the device may specifically be used in various electronic devices.

As shown in FIG. 10, the display device of this embodiment includes: a first determining unit 1001 configured to determine, in response to a current account not having an access authority for accessing a target file, an associated account of the current account, where a user corresponding to the associated account matches a user corresponding to the current account; and a displaying unit 1002 configured to display prompt information based on a relevant authority of the associated account for the target file, where the prompt information is used to prompt a way to access the target file, and the relevant authority includes at least one of an access authority and an application authority.

In some embodiments, the above-mentioned displaying unit 1002 is specifically configured to: display an application control in response to the current account having the application authority for applying to access the target file; and send an authority application request in response to detecting a triggering operation for the application control.

In some embodiments, the above-mentioned displaying unit 1002 is specifically configured to: display, in response to determining that the associated account includes a first type associated account having the access authority for accessing the target file, the first type associated account and an access control.

In some embodiments, the above-mentioned displaying unit 1002 is specifically configured to: switch to the first type associated account and display the target file, in response to detecting a triggering operation for the access control.

In some embodiments, the above-mentioned displaying unit 1002 is specifically configured to: display, in response to determining that the associated account includes a group associated with a management account group, the group associated with the management account group and an access control, where the management account group is a group to which a management account of the target file belongs.

In some embodiments, the above-mentioned displaying unit 1002 is specifically configured to: hide an account list of the associated account in response to determining that the associated account does not include an account having the relevant authority for the target file.

In some embodiments, the above-mentioned displaying unit 1002 is specifically configured to: hide the account list of the associated account in response to determining that the associated account does not include an account having the access authority for the target file.

In some embodiments, a display interface includes a folding control, the above-mentioned displaying unit 1002 is specifically configured to: display an account list of the associated account in response to detecting a triggering operation for the folding control.

In some embodiments, the above-mentioned displaying unit 1002 is specifically configured to: determine whether a group to which the associated account belongs includes a management account group, where the management account group is a group to which a management account of the target file belongs; and display, in response to determining that the group to which the associated account belongs includes the management account group, the associated account belonging to the management account group in a predefined prominent position.

In some embodiments, in response to the current account not having the application authority for applying to access the target file, the above-mentioned displaying unit 1002 is specifically configured to: hide the account list of the associated account in response to determining that the associated account does not include an account having the access authority and/or the application authority for the target file.

In some embodiments, in response to the current account not having the application authority for applying to access the target file, the above-mentioned displaying unit 1002 is specifically configured to: display, in response to determining that the associated account includes a second type associated account having the application authority for the target file, the second type associated account and a switch control.

In some embodiments, the device further includes a switching unit 1003 configured to: switch to the second type associated account, in response to detecting a triggering operation for the switch control; and send an authority application request in response to a triggering operation for an application control corresponding to the second type associated account.

In some embodiments, in response to the current account not having the application authority for applying to access the target file, the above-mentioned displaying unit 1002 is specifically configured to: display, in response to determining that the associated account includes an account associated with a management account group, the account associated with the management account group and a switch control, where the management account group is a group to which a management account of the target file belongs.

Figure 11:
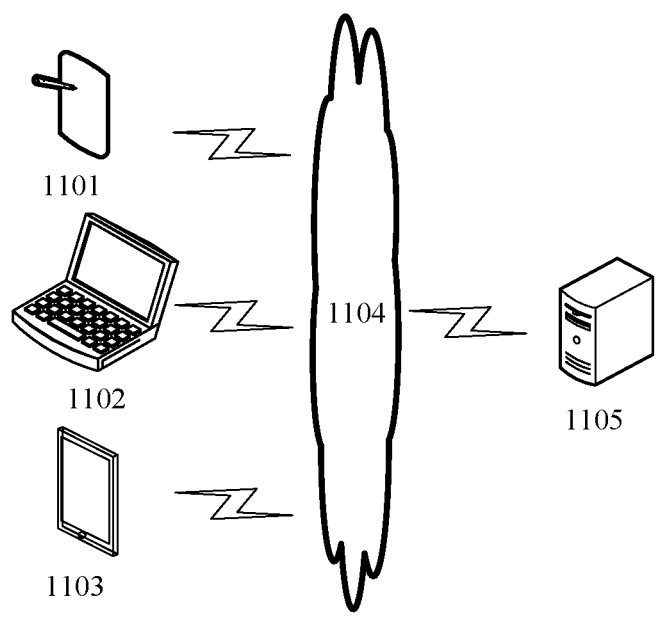
FIG. 11 is an exemplary system architecture to which a display method according to an embodiment of the present disclosure may be applied.

Reference is made to FIG. 11, which is an exemplary system architecture to which a display method according to an embodiment of the present disclosure may be applied.

As shown in FIG. 11, the system architecture may include terminal devices 1101, 1102, and 1103, a network 1104, and a server 1105. The network 1104 is a medium used to provide a communication link between the terminal devices 1101, 1102, 1103 and the server 1105. The network 1104 may include various connection types, such as wired, wireless communication links, or fiber optic cables.

The terminal devices 1101, 1102, and 1103 may interact with the server 1105 through the network 404 to receive or send messages and the like. Various client applications, such as video publishing applications, search applications, and news information applications, may be installed on the terminal devices 1101, 1102 and 1103. The client applications in the terminal devices 1101, 1102, and 1103 may receive the user's instruction, and complete corresponding functions according to the user's instruction, such as adding corresponding information to the information according to the user's instruction.

The terminal devices 1101, 1102, and 1103 may be hardware or software. When the terminal devices 1101, 1102, and 1103 are hardware, they may be various electronic devices that have a display screen and support web browsing, including but not limited to smart phones, tablet computers, e-book readers, MP3 players (Moving Picture Experts Group Audio Layer III), MP4 (Moving Picture Experts Group Audio Layer IV) players, laptops and desktops, etc. When the terminal devices 1101, 1102, and 1103 are software, they may be installed in the electronic devices listed above. They may be implemented as multiple software or software modules (e.g., software or software modules for providing distributed services), or may be implemented as a single software or software module, which is not limited here.

The server 1105 may be a server that can provide various services, such as receiving information acquiring requests sent by terminal devices 1101, 1102, and 1103, acquiring display information corresponding to the information acquiring requests in various manners according to the information acquiring requests, and sending data related to the display information to the terminal devices 1101, 1102, and 1103.

It should be noted that the display method provided by the embodiment of the present disclosure may be executed by a terminal device, and correspondingly, a display device may be arranged in the terminal devices 1101, 1102, and 1103. In addition, the display method provided by the embodiment of the present disclosure may also be executed by the server 1105, and accordingly, the display device may be arranged in the server 1105.

It should be understood that the numbers of terminal devices, networks and servers in FIG. 11 are merely illustrative. There may be any number of terminal devices, networks and servers according to implementation needs.

Figure 12:
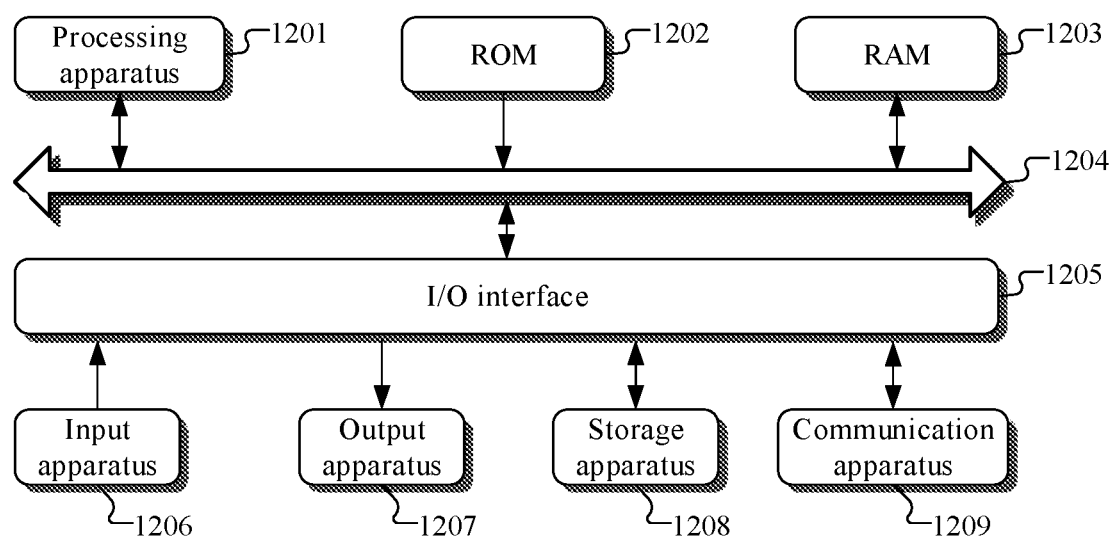
FIG. 12 a schematic diagram of a basic structure of an electronic device according to an embodiment of the present disclosure.

Reference is made to FIG. 12 which shows a schematic structural diagram of an electronic device (such as terminal devices or servers in FIG. 11) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 12 is schematic, and is not intended to limit functions and scope of the embodiments of the present disclosure.

As shown in FIG. 12, the electronic device may include a processing apparatus (such as a central processor and a graphic processor) 1201. The processing apparatus may perform various appropriate actions and processing by executing programs stored in a read-only memory (ROM) 1202 or programs uploaded from a storage apparatus 1208 to a random access memory (RAM) 1203. Various programs and data required for operations of the electronic device 1200 are also stored in the RAM 1203. The processing apparatus 1201, the ROM 1202 and the RAM 1203 are connected to each other through the bus 1204. An input/output (I/O) interface 1205 is also connected to the bus 1204.

Generally, the following components are connected to the I/O interface 1205: an input apparatus 1206 such as a touch screen, a touch panel, a keyboard, a mouse, a camera, a microphone, an accelerometer, and gyroscope; an output apparatus 1207 such as a liquid crystal display (LCD), a loudspeaker and a vibrator; a storage apparatus 1208 such as a magnetic tape and a hard disk; and a communication apparatus 1209. The communication apparatus 1209 may allow the electronic device to communicate with other device in a wired or wireless manner to exchange data. Although FIG. 12 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 1209, installed from the storage apparatus 1208 or installed from the ROM 1202. The computer program is executed by the processing apparatus 1201 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. The one or more programs, when executed by the electronic device, cause the electronic device to: determine, in response to a current account not having a relevant authority for accessing a target file, an associated account of the current account, where a user corresponding to the associated account matches a user corresponding to the current account; and display prompt information based on the relevant authority of the associated account for the target file, where the prompt information is used to prompt a way to access the target file, the relevant authority includes at least one of an access authority and an application authority.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the first determination unit 401 may also be described as "a unit for determining the associated account of the current account".

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A display method comprising:
   determining, in response to a current account not having an access authority for accessing a target file, an associated account of the current account, wherein a user corresponding to the associated account matches a user corresponding to the current account; and
   displaying prompt information based on a relevant authority of the associated account for the target file, wherein the relevant authority comprises at least one of an access authority and an application authority,
   wherein the displaying prompt information based on a relevant authority of the associated account for the target file comprises:
      displaying, in response to determining that the associated account comprises a first type associated account having the access authority for accessing the target file, the first type associated account and an access control,
   the method further comprising:
   switching to the first type associated account and displaying the target file, in response to detecting a triggering operation for the access control;
   wherein the displaying prompt information based on a relevant authority of the associated account for the target file comprises:
      hiding an account list of the associated account in response to determining that the associated account does not comprise an account having the relevant authority for the target file.

2. The method according to claim 1, wherein the displaying prompt information based on a relevant authority of the associated account for the target file comprises:
   displaying, in response to determining that the associated account comprises a group associated with a management account group, the group associated with the management account group and an access control, wherein the management account group is a group to which a management account of the target file belongs.

3. The method according to claim 1, wherein the hiding an account list of the associated account in response to determining that the associated account does not comprise an account having the relevant authority for the target file comprises:
   hiding the account list of the associated account in response to determining that the associated account does not comprise an account having the access authority for the target file.

4. The method according to claim 1, wherein the displaying prompt information based on a relevant authority of the associated account for the target file comprises:
   displaying an account list of the associated account in response to detecting a triggering operation on a display interface.

5. The method according to claim 4, wherein the displaying an account list of the associated account in response to detecting a triggering operation on a display interface comprises:
   determining whether a group to which the associated account belongs comprises a management account group, wherein the management account group is a group to which a management account of the target file belongs; and
   displaying, in response to determining that the group to which the associated account belongs comprises the management account group, the associated account belonging to the management account group in a predefined prominent position.

6. The method according to claim 1, wherein in response to the current account not having the application authority for applying to access the target file, the hiding an account list of the associated account in response to determining that the associated account does not comprise an account having the relevant authority for the target file comprises:
   hiding the account list of the associated account in response to determining that the associated account does not comprise an account having the access authority and/or the application authority for the target file.

7. The method according to claim 1, wherein in response to the current account not having the application authority for applying to access the target file, the displaying prompt information based on a relevant authority of the associated account for the target file comprises:
   displaying, in response to determining that the associated account includes a second type associated account having the application authority for the target file, the second type associated account and a switch control.

8. The method according to claim 7, further comprising:
   switching to the second type associated account, in response to detecting a triggering operation for the switch control; and
   sending an authority application request in response to a triggering operation for an application control corresponding to the second type associated account.

9. The method according to claim 1, wherein in response to the current account not having the application authority for applying to access the target file, the displaying prompt information based on a relevant authority of the associated account for the target file comprises:

displaying, in response to determining that the associated account comprises an account associated with a management account group, the account associated with the management account group and a switch control, wherein the management account group is a group to which a management account of the target file belongs.

10. A display device comprising:
at least one processor; and
at least one memory communicatively coupled to the at least one processor and storing instructions that upon execution by the at least one processor cause the device to:
   determine, in response to a current account not having an access authority for accessing a target file, an associated account of the current account, wherein a user corresponding to the associated account matches a user corresponding to the current account; and
   display prompt information based on a relevant authority of the associated account for the target file, wherein the prompt information is used to prompt a way to access the target file, and the relevant authority comprises at least one of an access authority and an application authority,
the at least one memory further storing instructions that upon execution by the at least one processor cause the device to:
   display, in response to determining that the associated account comprises a first type associated account having the access authority for accessing the target file, the first type associated account and an access control; and
   switch to the first type associated account and displaying the target file, in response to detecting a triggering operation for the access control;
wherein the displaying prompt information based on a relevant authority of the associated account for the target file comprises:
   hiding an account list of the associated account in response to determining that the associated account does not comprise an account having the relevant authority for the target file.

11. A computer-readable non-transitory medium storing a computer program, the computer program, when executed by a computer, cause the computer to
   determine, in response to a current account not having an access authority for accessing a target file, an associated account of the current account, wherein a user corresponding to the associated account matches a user corresponding to the current account;
   display prompt information based on a relevant authority of the associated account for the target file, wherein the relevant authority comprises at least one of an access authority and an application authority;
   display, in response to determining that the associated account comprises a first type associated account having the access authority for accessing the target file, the first type associated account and an access control; and
   switch to the first type associated account and displaying the target file, in response to detecting a triggering operation for the access control;
wherein the displaying prompt information based on a relevant authority of the associated account for the target file comprises:
   hiding an account list of the associated account in response to determining that the associated account does not comprise an account having the relevant authority for the target file.

12. The device of claim 10, the at least one memory further storing instructions that upon execution by the at least one processor cause the device to:
   display, in response to determining that the associated account comprises a group associated with a management account group, the group associated with the management account group and an access control, wherein the management account group is a group to which a management account of the target file belongs.

13. The device of claim 10, the at least one memory further storing instructions that upon execution by the at least one processor cause the device to:
   hide an account list of the associated account in response to determining that the associated account does not comprise an account having the relevant authority for the target file.

* * * * *